United States Patent [19]
Suzuki et al.

[11] Patent Number: 5,095,440
[45] Date of Patent: Mar. 10, 1992

[54] NUMERICAL CONTROL APPARATUS

[75] Inventors: Tomohiro Suzuki; Yasushi Fukaya, both of Niwa, Japan

[73] Assignee: Kabushiki Kaisha Okuma Tekkosho, Aichi, Japan

[21] Appl. No.: 457,165

[22] Filed: Dec. 26, 1989

[30] Foreign Application Priority Data

Dec. 28, 1988 [JP] Japan .................. 63-333842

[51] Int. Cl.$^5$ ................ G06F 15/46; G05B 19/18
[52] U.S. Cl. ..................... 364/474.33; 364/474.32; 318/579; 318/570
[58] Field of Search ............. 364/474.32, 474.33, 364/167.01, 474.28; 318/570, 579, 569

[56] References Cited

U.S. PATENT DOCUMENTS

| | | | |
|---|---|---|---|
| 4,680,719 | 7/1987 | Kishi et al. | 364/474.32 |
| 4,692,873 | 9/1987 | Kishi et al. | 364/474.33 |
| 4,706,200 | 11/1987 | Kishi et al. | 364/167.01 |
| 4,739,489 | 4/1988 | Kishi et al. | 364/474.33 |
| 4,740,902 | 4/1988 | Yoneda et al. | 364/474.33 |
| 4,745,558 | 5/1988 | Kishi et al. | 364/474.33 |

*Primary Examiner*—Jerry Smith
*Assistant Examiner*—Paul Gordon
*Attorney, Agent, or Firm*—Wenderoth, Lind & Ponack

[57] ABSTRACT

A numerical control apparatus is characterized by a structure in which: a machining program stores the final shape of a work as well as the shape of a material; designates the outermost point (an apex) on the work in a direction opposing a cutting direction as a cutting reference point; sets linear lines which are respectively lowered from the cutting reference point by cutting depths, and obtains the intersection of the lines and the material shape. The intersections thus obtained are classified into points where the tool enters the work zone and points where the tool emerges from the work zone, so that the tool can be moved at a predetermined cutting rate for a cutting operation between the point where it enters and the point where it emerges from the work zone while it is moved at a rapid traverse rate between the emerging point and the point where it re-enters the work zone. These operations are repeated until the tool touches the final machining shape, whereupon the tool is moved along the final machining shape at the predetermined cutting rate and cutting depth. In this manner, the cutting tool is prevented from idle operations in the feed zones where the material does not exist and the machining time can be reduced effectively.

5 Claims, 9 Drawing Sheets

NUMERICAL CONTROL APPARATUS

BACKGROUND OF THE INVENTION

This invention relates to a numerical control apparatus which has a function to repeat a cutting cycle until a work is machined to the final shape indicated in a machining program.

FIG. 1 shows a prior art numerical control apparatus.

In the figure, the reference numeral 1 denotes a machining program; element 2 is a program reading means to read-in the machining program, and element 3 is a final machining shape storing means which stores the final machining shape indicated in the machining program. The reference numeral 4 denotes a cutting start point calculating means to calculate a cutting start point C1 from which cutting starts for each of the plural cutting cycles; element 5 is a cutting start point moving command generating means to generate a cutting start point moving command MV1 to move the tool to the cutting start point C1; element 6 is a rod path line generating means to generate a rod path line B1 based on the cutting start point C1; element 7 is a final machining shape intersection calculating means to calculate intersections of the rod path line B1 and the final machining shape; element 8 is a rod cutting line command generating means to generate a rod cutting line command BV1 to move the tool along the rod cutting line B1 at the cutting rate, and element 9 is a contour cutting line command generating means to generate a contour cutting line command CV1 to move the tool along the contour of the final machining shape at the cutting rate. A cutting cycle controlling means 10 controls the cycle by repeatedly operating the above means 4, 5, 6, 7, 8 and 9 until the contour is machined in accordance with the final machining form, element 11 is a function generating means to generate functions based on the rod cutting line command VB1, the contour cutting line command CV1 and the cutting start point moving command MV1, and a servo controller 12 controls a servo motor in accordance with the generated functions.

The operation of the system will now be described referring to FIG. 2 which shows an example of machining program and FIG. 3 which shows the final machining shape written in the machining program. In the figures, a point S indicates where cutting starts, or the reference point of the cutting cycle.

The program reading means 2 reads in the final machining shape commands "N001"-"N007", and has the data stored in the final machining shape storing means 3. When the program reading means 2 reads in the subsequent cutting cycle execution command "N008", it transfers the cutting cycle execution command C and the cutting cycle start signal CS to the cutting cycle controlling means 10. The cutting cycle controlling means 10 receives as input the cutting cycle execution command C and the start signal CS, and outputs the cutting depth D and the calculation start signal DS to the cutting start point calculating means 4 for calculating the start point. When receiving the cutting depth D and the calculation start signal DS, the cutting start point calculating means 4 receives the current position CPD (in this case, the cutting cycle reference point S) from the function generating means 11, and calculates the cutting start point C1 based on the reference point S and the cutting depth D (refer to FIG. 4), and inputs the cutting start point C1 to the cutting start point moving command generating means 5 to move the tool to the start point and to the rod path line generating means 6. The cutting cycle controlling means 10 transfers the generating start signal MS to the cutting start point moving command generating means 5. The cutting start point moving command generating means 5 generates and outputs the moving command MV1 to move the tool to the cutting start point C1 at a rapid traverse rate after receiving the generating start signal MS. Then, the function generating means 11 generates functions upon receipt of the moving command MV1 to thereby cause axial displacement via the servo motor (see FIG. 4).

The cutting cycle controlling means 10 transfers the generating start signal BS to the rod path line generating means 6. The rod path line generating means 6 generates the rod path line B1 based on the generating start signal BS and the cutting start point C1 (refer to FIG. 5A), and transfers it to the final machining shape intersection calculating means 7 which calculates the intersections with the final machining shape. The cutting cycle controlling means 10 transfers the calculating start signal AS to the final machining shape intersection calculating means 7, which, in turn, judges whether or not the rod path line B1 crosses the final machining shape upon receipt of the calculating start signal AS, and transfers the judgment signal AR to the cutting cycle controlling means 10 as well as transfers the intersection P (refer to FIG. 5B), if they do intersect, to the rod cutting line command generating means 8 and the contour cutting line command generating means 9. When the input judgment signal AR indicates the intersection, the cutting cycle controlling means 10 transfers the cutting feed rate F and the generating start signal BCS to the rod cutting line command generating means 8. The rod cutting line command generating means 8, upon receiving the generating start signal BCS, generates the rod cutting line command BV1 based on the cutting feed rate F, the rod path line B1, and the intersection P (refer to FIG. 5C), and transfers it to the function generating means 11 to generate a function for cutting feed along the rod cutting line as well as to cause axial displacement according thereto (refer to FIG. 4). Then, the cutting cycle controlling means 10 transfers the cutting feed rate F and the generating start signal CCS to the contour cutting line command generating means 9, which in turn generates the contour cutting line command CV1 based on the cutting feed rate F, the intersection P and the final machining shape when receiving the generating start signal CCS (refer to FIG. 5D), inputs the same to the function generating means 11, and generates a function along the final cutting start point moving command generating shape based on the cutting feed rate to cause axial displacement (refer to FIG. 4) accordingly.

The above cutting cycle comprising the axial movements MV1→BV1 →CV1 is repeated by the cutting cycle controlling means 10 until the work is machined to the final machining shape, and as a result, the axial displacement is achieved as MV2 →BV2 →CV2 →MV3 →CV3 →MV4 →BV4 →CV4 →MV5 →BV5 →CV5 →MV6 →BV6 →CV6 as shown in FIG. 4.

In the prior art numerical control apparatus mentioned above, the form of the material work is not considered in generating the cutting line. As a result, as shown in FIG. 6, the program commands the tool to move beyond the limits of the material work where in fact no cutting is needed (idle cutting), to thereby inconveniently prolong the machining time.

In short, the prior art cutting cycle for lathing includes the steps of determining the points along the line segment between the cutting cycle reference point and the point where the contour of the work to be finished starts by dividing the line segment with the cutting depth of the tool and of operating the tool at the cutting rate, starting from each of the above points thus determined until the tool touches the contour of the work to be finished, whereupon the tool moves along the final contour, cutting the work for its cutting depth. The prior art method is therefore defective in that idle cutting unavoidably occurs when applied to a work of an arbitrary form made by casting or forging, prolonging the machining time.

SUMMARY OF THE INVENTION

This invention was contrived to eliminate such defects encountered in the prior art and aims at providing a numerical control apparatus which can move a tool at a rapid traverse rate while the tool passes the portion where no work exists, to thereby prevent the machining time from extending unnecessarily.

More particularly, in order to overcome the defects in the prior art, this invention apparatus omits the conventional cutting start point calculating means, the cutting start point moving command generating means to move the tool to the cutting start point, the rod path line generating means and the rod cutting line command generating means, and newly adds a memory means which stores the shape of the material work, a means to calculate the apex of the material work, a means to generate tool point path, a means to calculate intersections, a means to judge intersections with material works, a means to generate a command for moving the tool to the first intersection, a means to generate a command for moving the tool outside the work zone, and a means to generate a command for moving the tool at the cutting rate within the work zone, to thereby avoid idle cutting outside of the work zone and hence, reduce the machining time.

DESCRIPTION OF THE PREFERRED EMBODIMENTS

Figure 1:
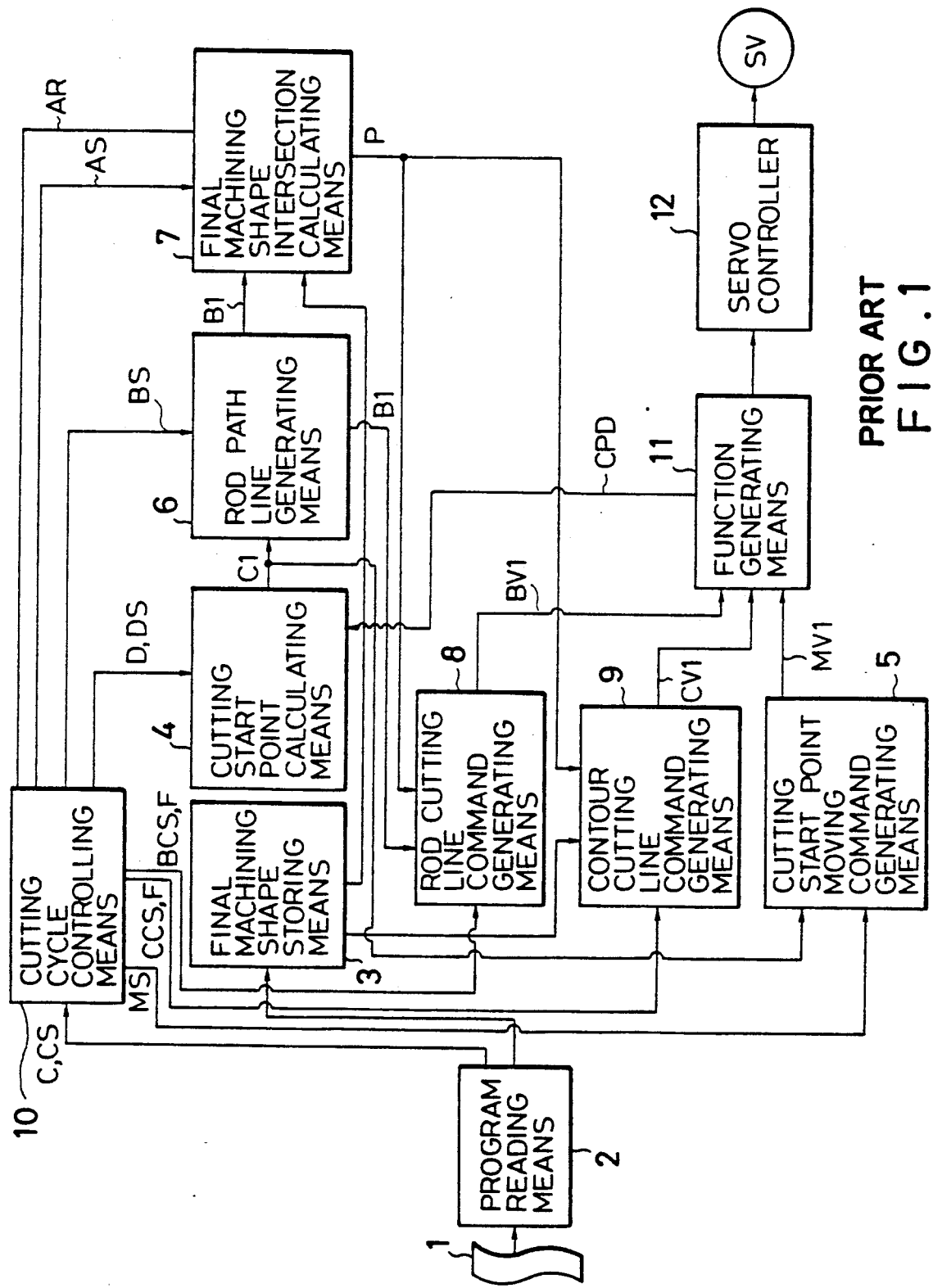
FIG. 1 is a block diagram showing an embodiment of the prior art apparatus.
Figure 2:
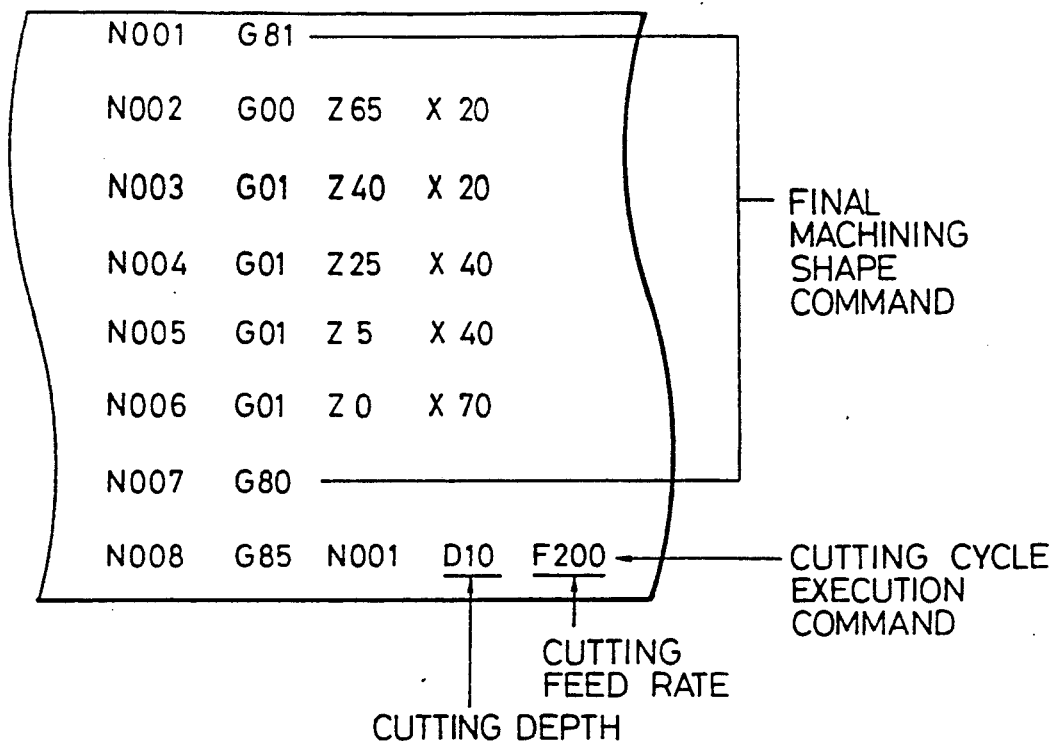
FIG. 2 is an example of a machining program.
Figure 3:
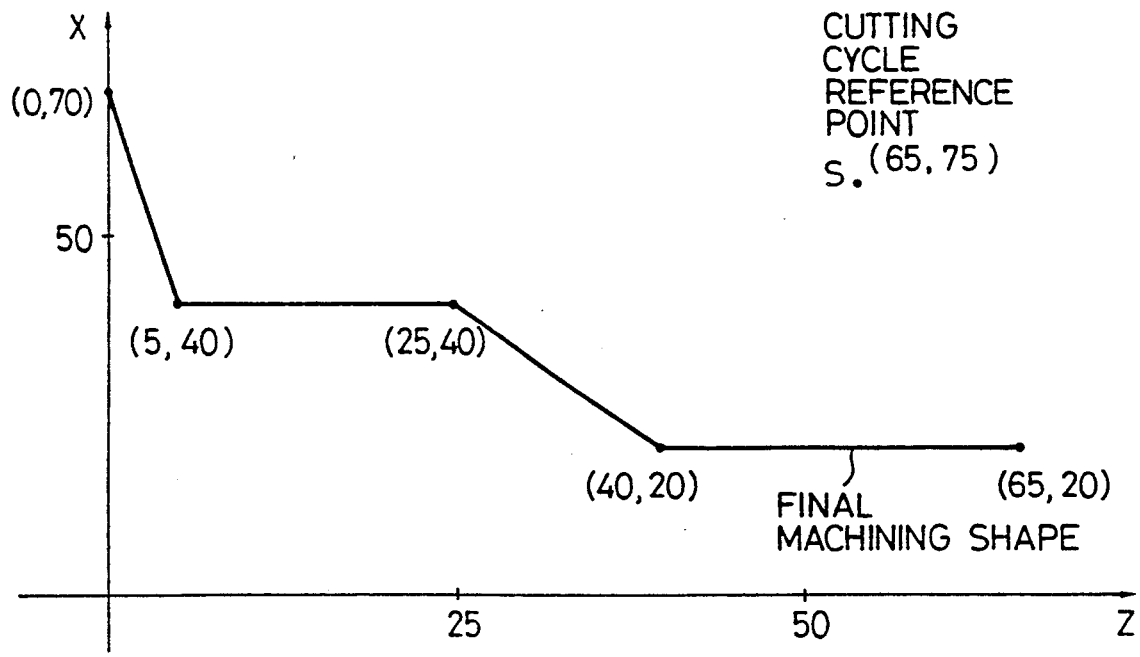
FIGS. 3 to 6 are views used to describe the operation thereof.
Figure 4:
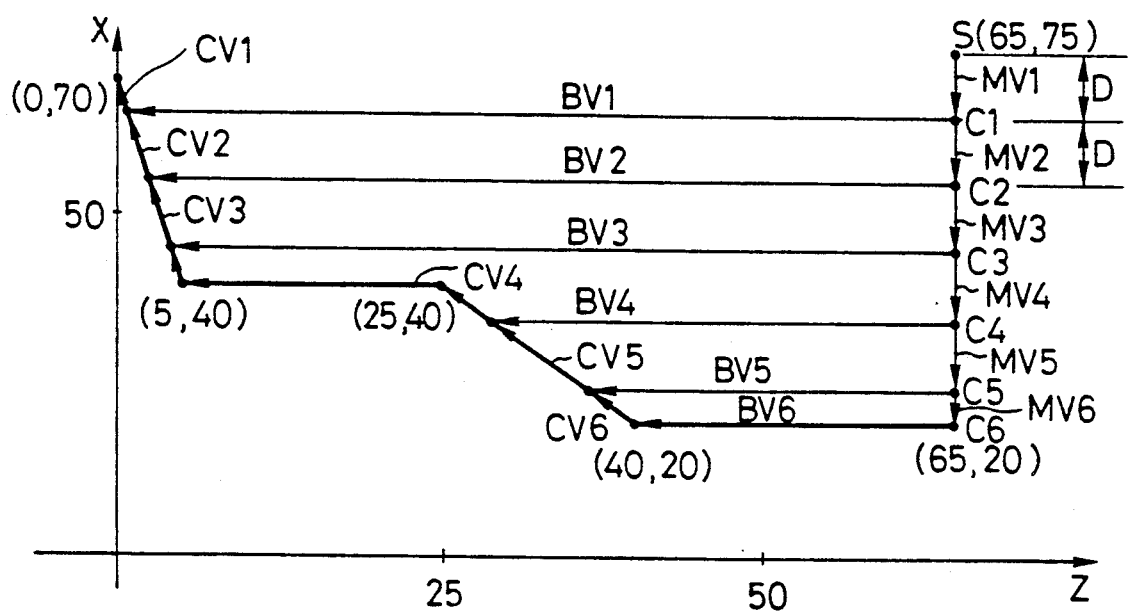
Figure 5A:
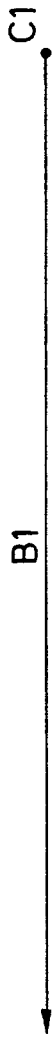
Figure 5B:
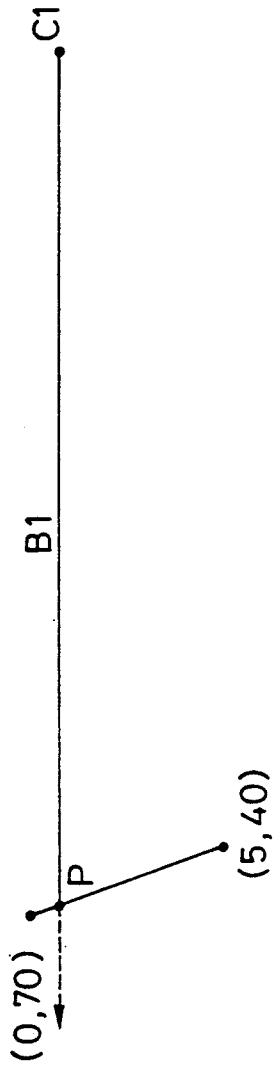
Figure 5C:
Figure 5D:
Figure 6:
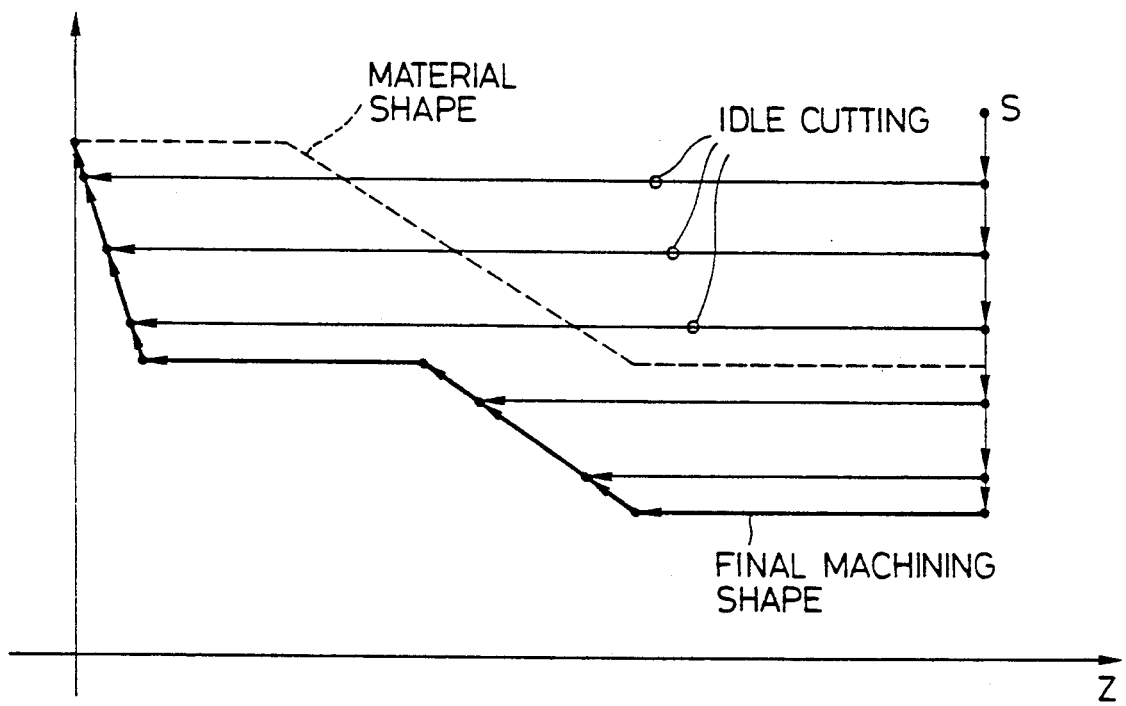
Figure 7:
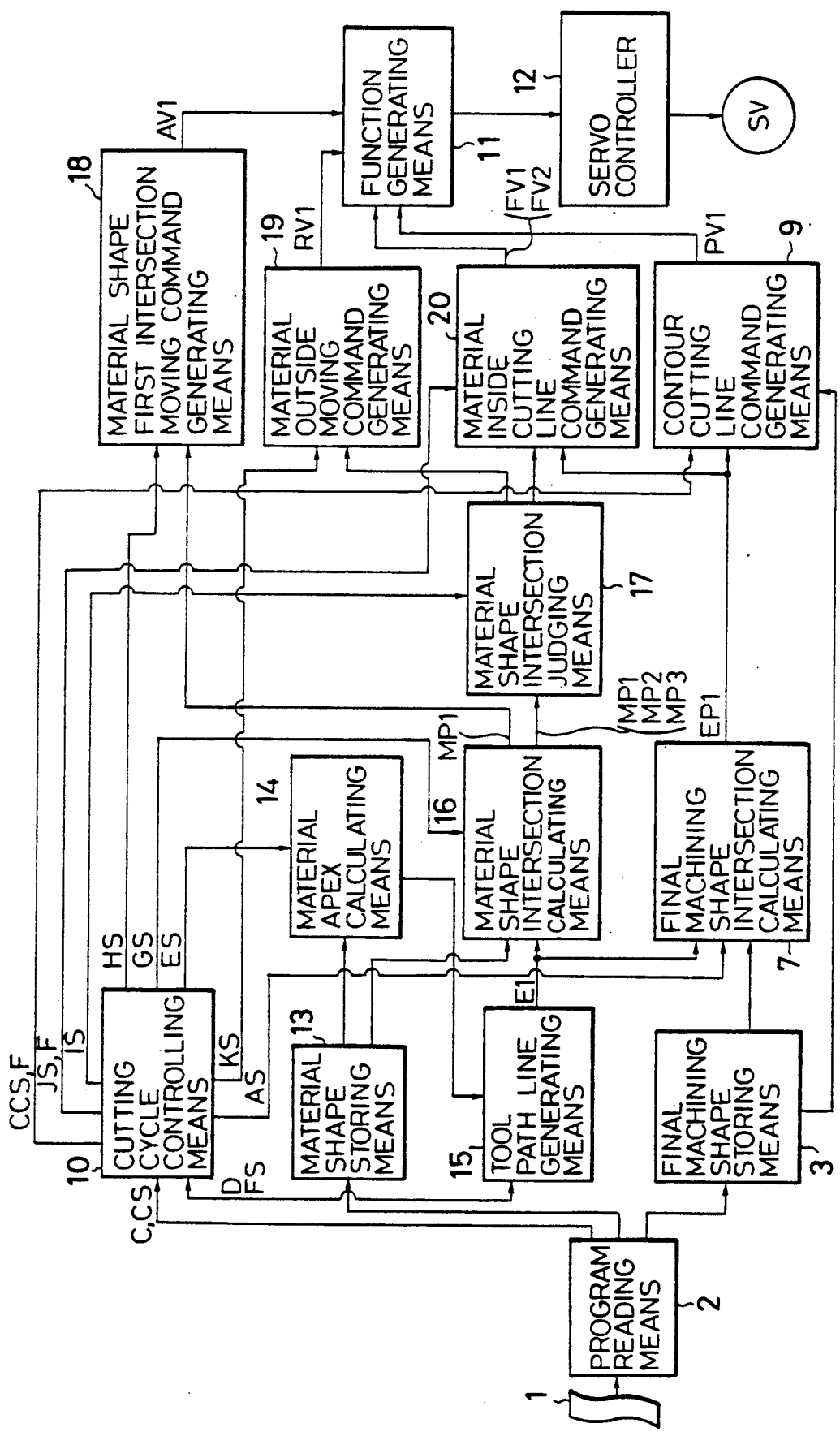
FIG. 7 is a block diagram showing an embodiment of the numerical control apparatus in accordance with the present invention.

A numerical control apparatus in accordance with the present invention has a structure shown in FIG. 7, wherein the same component parts are denoted with the same reference numerals as in FIG. 1. Description will be given only to the newly added means.

The reference numeral 13 denotes a material shape storing means to store the shape of a material written-in in the machining program 1; element 14 is a material apex calculating means to calculate the outermost point (apex) of the material in the direction opposite to the cutting direction of the tool; element 15 is a tool path line generating means to generate the tool path line E1 on the basis of the apex; element 16 is a material shape intersection calculating means to calculate the intersections between the tool path line E1 and the material, element 17 i a material shape intersection judging means to judge whether thus obtained intersection is the point where the tool path line E1 enters the material zone or the point where the line emerges from the material zone, and element 18 is a material shape first intersection moving command generating means to generate a command AV1 for moving the tool at a rapid traverse rate to the first point with the material shape intersection obtained by the material shape intersection calculating means 16. The reference numeral 19 denotes a material outside moving command generating means to generate a command RV1 for moving the tool at a rapid traverse rate between the point where the tool emerges from the material zone and the point where the tool re-enters the material zone, and element 20 is a material inside cutting line command generating means to generate a cutting line within the material zone where the tool moves at the cutting rate between the entering point and the emerging point or the intersection with the final machining shape. The cutting cycle controlling means 10 controls the cutting cycle by repeatedly operating the above means 15, 14, 16, 7, 17, 18, 19, 20 and 9.

Figure 8:
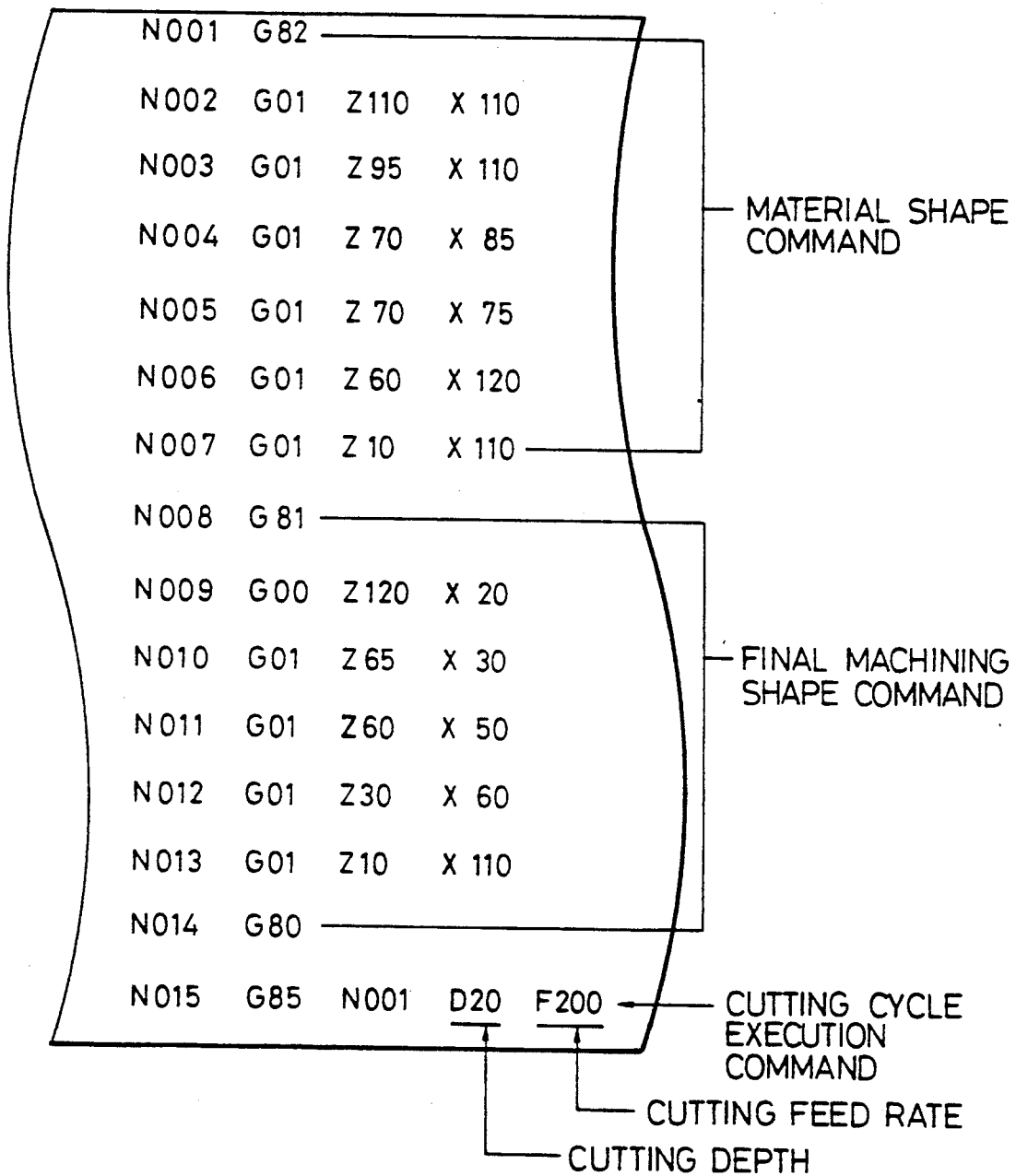
FIG. 8 is an example of a machining program thereof.
Figure 9:
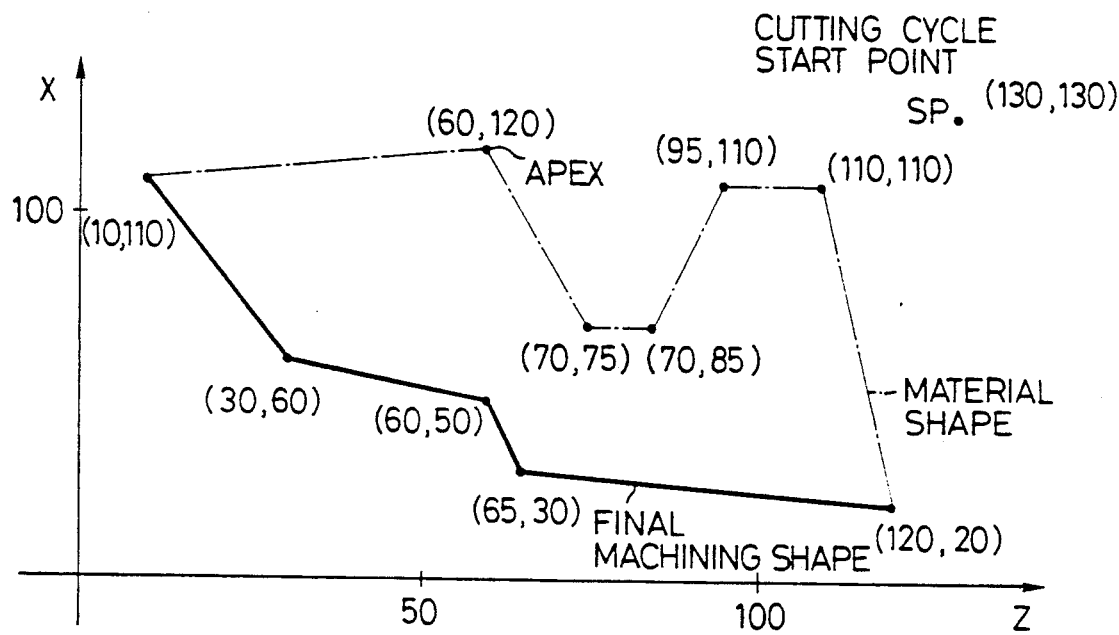
FIGS. 9 to 11 are views used to describe the operations thereof.
Figure 10:
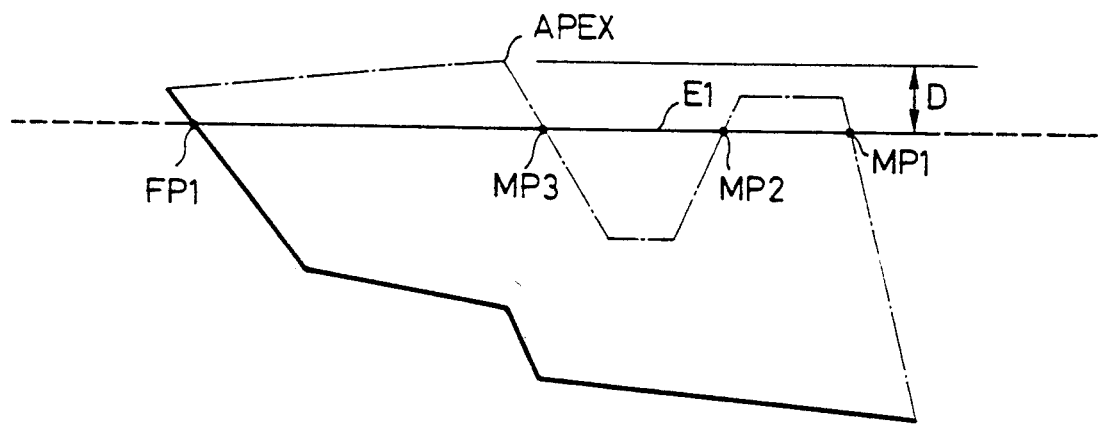

Referring to FIGS. 8 through 11, an embodiment of this invention will now be described specifically. FIG. 8 shows an example of machining program, and FIG. 9 shows the shape of the material shape and that of the final machining shape indicated in the machining program. In the figures, the point SP indicates the point where the cutting cycle starts.

The program reading means 2 reads in the material shape commands "N001" to "N007", stores them in the material shape storing means 13, reads in the final machining shape commands "N008" to "N014", and stores the same in the final machining shape storing means 3. Subsequently, the program reading means 2 reads in the cutting cycle execution command "N015", and transfers the cutting cycle execution command C and the cutting start signal CS for the cutting cycle to the cutting cycle controlling means 10. The cutting cycle controlling means 10 receives as input the cutting cycle execution command C and the start signal CS, and sends the calculating start signal ES to the material apex calculating means 14. On receiving as input the calculating start signal ES, the material apex calculating means 14 receives the material shape from the material shape storing means 13, calculates its outermost point (apex) with respect to the direction of depth, and transfers it to the tool path line generating means 15. In the case shown in FIG. 9, the point "Z=60, X=120" is the apex.

The cutting cycle controlling means 10 transfers the cutting depth D and the generating start signal FS to the tool path line generating means 15. When the tool path line generating means 15 receives the generating start signal FS and the cutting depth D as input, it generates the tool point path line E1 (see FIG. 10) in a linear form in the same direction as the tool feed direction based on the apex position and the cutting depth D, and transfers them to the material shape intersection calculating means 16 and the final machining shape intersection calculating means 7 to calculate the intersections of the tool path with the material and the final machining shape, respectively. The cutting cycle controlling means 10 transfers the calculating start signal GS to the material shape intersection calculating means 16, which in turn calculates the intersections MP1, MP2 and MP3 (see FIG. 10) of the material shape and the tool path line, transfers them to the material shape intersection judging means 17 and inputs the first intersection MP1 alone to the material shape first intersection moving command generating means 18. The cutting cycle controlling means 10 transfers the generating start signal HS to the material shape first intersection moving command generating means 18, which in turn, generates the moving command AV1 from the current position (in this case the cutting cycle start point SP) to the intersection MP1 at the rapid traverse rate and transfers the command to the function generating means 11. Upon receipt of the moving command AV1, the function generating means 11 generates the function and the command for axial displacement is executed via the servo controller 12 (refer to FIG. 11).

Then, the cutting cycle controlling means 10 transfers the judgment start signal IS to the material shape intersection judging means 17 which judges the intersection with the material, which in turn judges whether respective intersections MP1, MP2 and MP3 received from the material shape intersection calculating means 16 are the points where the line enters or emerges from the material zone, and inputs the result of the judgment both at the material outside moving command generating means 19 to move the tool outside the material zone and the material inside cutting line command generating means 20 for designating the cutting line within the material zone. In the case shown in FIG. 10, the intersections MP1 and MP3 are where the line enters the material zone while the intersection MP2 is where the line leaves the material zone. The cutting cycle controlling means 10 transfers the feed rate F and the generating start command JS to the material inside cutting line command generating means 20 which designates the cutting line within the material zone. The material inside cutting line command generating means 20, in receiving the generating start command JS, generates the material inside cutting line command FV1 based on the feed rate F and the intersections MP1 and MP2, transfers it to the function generating means 11, whereby the function generating means 11 generates the function for cutting along the designated line within the material zone at the cutting rate and for causing the axial displacement accordingly (see FIG. 11).

Figure 11:
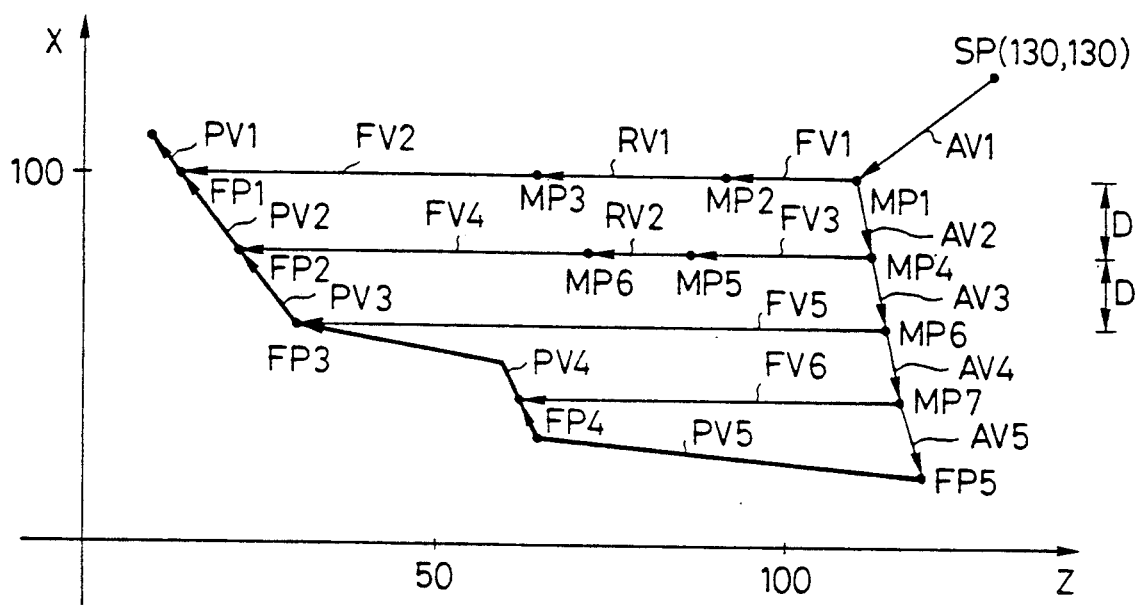

The cutting cycle controlling means 10 transfers the generating start command KS to the material outside moving command generating means 19, upon receiving the generating start command KS, generates command RV1 to move the tool out of the material zone based on the intersection MP2 and MP3, and transfers it to function generating means 11 for generating the function to move the tool at the rapid traverse rate from the intersection MP2 to the intersection MP3 and to cause the axial displacement (refer to FIG. 11). The cutting cycle controlling means 10 then transfers the calculating start signal AS to the final machining shape intersection calculating means 7, which in turn calculates the intersection EP1 of the final machining shape and the tool path line E1, and inputs it to the material inside cutting line command generating means 20 as well as contour cutting line command generating means 9 (refer to FIG. 10). Subsequently, the cutting cycle controlling means 10 transfers the feed rate F and the generating start command JS to the material inside cutting line command generating means 20. The material inside cutting line command generating means 20 generates the cutting line FV2 within the material zone based on the feed rate F and the intersections MP3 and FP1, and inputs it to the function generating means 11 for generating the function at tool feed rate for cutting along the line in the material zone and causing the axial displacement accordingly (refer to FIG. 11). The cutting cycle controlling means 10 transfers the tool feed rate F and the generating start signal CCS to the contour cutting line command generating means 9. The contour cutting line command generating means 9 generates the contour cutting line PV1 based on the feed rate F, the intersection FP1 and the final machining shape after receiving the generating start signal CCS, and transfers it to the function generating means 11 for generating the function for cutting at the cutting rate along the final machining shape and for causing the axial displacement (refer to FIG. 11).

The cutting cycle comprising the axial movements AV1→FV1→RV1→FV2→PV1 is repeated until all the commands at the cutting rate along the entire contour of the final machining shape are outputted from the cutting cycle controlling means 10. As a result, the axial displacement shown in FIG. 11 as AV2→FV3→RV2→FV4→PV2→AV3→FV5→AV4→FV6→PV4→AV5→PV5 are effected.

As described in the foregoing statement, this invention apparatus can eliminate wasteful cutting operations for a work having complicated recesses to shorten the machining time.

What is claimed is:

1. A method of operating a numerical control apparatus having a function to repeat a cutting cycle until a material is cut to a final machining shape indicated in a machining program comprising the steps of: storing a material shape indicated in the machining program in addition to said final machining shape; setting straight lines at an interval of a cutting depth starting from a cutting reference point; determining intersections of said straight lines with the material shape; classifying the intersections as points from which the tool enters into a material zone and as points from which said tool emerges from the material zone; and, moving the tool at a predetermined cutting rate from the point where it enters the material zone until it emerges therefrom at an emerging point, but moving the tool at a rapid traverse rate between the emerging point and the point where the tool enters said material zone; wherein these operation steps are repeated until the tool touches said final machining shape, whereupon the tool is operated at said predetermined cutting rate along said final machining shape for said cutting depth.

2. A numerical control apparatus, having a function to repeat a cutting cycle until a material is cut to a final machining shape indicated in a machining program, comprising: a memory means for storing said final machining shape indicated in said machining program; a memory means for storing a material shape indicated in said machining program; a calculating means for calculating an outermost point of said material shape in a direction opposing a cutting direction; a generating means for generating a linear tool point path line in a direction identical to the feed direction of the tool based on the outermost point of said material shape; a calculating means for calculating intersections of said tool point path lines with the material shape stored in said memory means; a generating means for generating commands to move the tool at a rapid traverse rate to the first intersection amount the intersections of the tool point path line with said material shape; a calculating means for calculating the intersections of the tool point path lines produced by said generating means with the final machining shape stored in the memory means; a judgment means which judges whether the points are the point where the tool is entering a material zone of the material shape stored in said memory means or the points where the tool is emerging therefrom; a generating means for generating commands to move the tool at a predetermined cutting rate between the point wherein the tool is entering into said material zone and the point wherein the tool is emerging therefrom, and between the point wherein the tool is entering into the material zone and the intersection of the tool point path line with the final machining shape calculated by said calculating means; a generating means for generating commands to move the tool at the rapid traverse rate between the point wherein the tool is emerging from the material zone which has been judged by said judgement means and the point wherein the tool is entering said material zone; a generating means for generating commands to move the tool between the intersections of the tool point path lines with said final machining shape calculated by said calculating means along the final machining shape stored in said memory means; and a cutting cycle controlling means for repeating the operations until all the commands for cutting at the predetermined cutting rate along the final machining shape stored in the memory means are outputted, whereby the cutting cycle is repeated based on the material shape indicated in said machining program until the final machining shape indicated in said program is obtained while avoiding idle operating of the tool.

3. A numerical control apparatus as claimed in claim 2, further comprising a program reading means for reading in said machining program in order to give commands to said cutting cycle controlling means, material shape memory and final machining shape memory.

4. A numerical control apparatus as claimed in claim 2, further comprising a function generating means for generating functions for moving the tool along the cutting line of the material within the material zone and for cutting the contour of the material based on the respective outputs from the command generating means for moving the tool to the first intersection with the material and for moving the tool outside the material zone.

5. A numerical control apparatus as claimed in claim 4, further comprising a servo controlling means for driving a servo motor based on said functions.

* * * * *